(12) United States Patent
Xu et al.

(10) Patent No.: US 12,056,530 B2
(45) Date of Patent: Aug. 6, 2024

(54) DILATED CONVOLUTION ACCELERATION CALCULATION METHOD AND APPARATUS

(71) Applicant: CANAAN BRIGHT SIGHT CO., LTD., Beijing (CN)

(72) Inventors: Bing Xu, Beijing (CN); Nangeng Zhang, Beijing (CN)

(73) Assignee: CANAAN BRIGHT SIGHT CO., LTD, Beijing (CN)

( * ) Notice: Subject to any disclaimer, the term of this patent is extended or adjusted under 35 U.S.C. 154(b) by 0 days.

(21) Appl. No.: 18/014,635

(22) PCT Filed: Nov. 3, 2020

(86) PCT No.: PCT/CN2020/126195
§ 371 (c)(1),
(2) Date: Jan. 5, 2023

(87) PCT Pub. No.: WO2022/007265
PCT Pub. Date: Jan. 13, 2022

(65) Prior Publication Data
US 2023/0273829 A1   Aug. 31, 2023

(30) Foreign Application Priority Data
Jul. 8, 2020   (CN) .......................... 202010659646.6

(51) Int. Cl.
*G06F 9/50* (2006.01)
*G06F 7/50* (2006.01)
*G06F 7/523* (2006.01)

(52) U.S. Cl.
CPC .............. *G06F 9/5027* (2013.01); *G06F 7/50* (2013.01); *G06F 7/523* (2013.01)

(58) Field of Classification Search
None
See application file for complete search history.

(56) References Cited

U.S. PATENT DOCUMENTS 10,067,509 B1    9/2018  Wang et al.
2022/0122237 A1*  4/2022  Yi ............................. G06T 5/30

FOREIGN PATENT DOCUMENTS

CN      109919295       6/2019
CN      110543849       12/2019
(Continued)

OTHER PUBLICATIONS

International Search Report for PCT/CN2020/126195, dated Apr. 8, 2021, 4 pages.
(Continued)

*Primary Examiner* — Scott C Sun
(74) *Attorney, Agent, or Firm* — Nixon & Vanderhye P.C.

(57) ABSTRACT

A dilated convolution acceleration calculation method and apparatus. The method comprises: decomposing a dilated convolution computation of R×S into S sub-dilated convolution computations of R×1 (301); for each sub-dilated convolution computation, caching a plurality of weight values in parallel to a plurality of calculation units in a calculation unit array (302); determining, from input image data, a plurality of input data streams respectively corresponding to the plurality of weight values, and inputting the plurality of input data streams in parallel into the plurality of calculation units (303); within the plurality of calculation units, executing a sliding window operation and a multiplication operation on the basis of the cached weight values and the input data streams, and executing an accumulation operation between the plurality of calculation units, so as to output an intermediate result of the sub-dilated convolution computation (304); and superimposing intermediate results of the S sub-dilated convolution computations of R×1, so as to obtain a convolution result of the dilated convolution computation (305). By using the method, a dilated convolution operation is accelerated with a relatively low com- (Continued)

plexity, and the function of Im2col does not need to be separately realized, thereby reducing the complexity.

10 Claims, 7 Drawing Sheets

(56) References Cited

FOREIGN PATENT DOCUMENTS

| CN | 111178519 | 5/2020 |
|---|---|---|
| CN | 111260037 | 6/2020 |

OTHER PUBLICATIONS

Written Opinion of the ISA for PCT/CN2020/126195, dated Apr. 8, 2021, 3 pages.

Extended European Search Report mailed Mar. 25, 2024 in European Application No. 20944528.7, 9 pages.

Wenjian Liu et al., "USCA: A Unified Systolic Convolution Array Architecture for Accelerating Sparse Neural Network," 2019 IEEE International Symposium on Circuits and Systems (ISCAS), IEEE, May 26, 2019, pp. 1-5.

Dongseok Im et al., "DT-CNN: Dilated and Transposed Convolution Neural Accelerator for Real-Time Image Segmentation on Mobile Devices," 2019 IEEE International Symposium on Circuits and Systems (ISCAS), IEEE, May 26, 2019, pp. 1-5.

Minsik Kim et al., "Efficient Dilated-Winograd Convolutional Neural Networks," 2019 IEEE International Conference on Image Processing (ICIP), IEEE, Sep. 22, 2019, pp. 2711-2715.

Fisher Yu et al., "Multi-Scale Context Aggregation by Dilated Convolutions," arXiv.org, Apr. 30, 2016, pp. 1-13.

\* cited by examiner

DILATED CONVOLUTION ACCELERATION CALCULATION METHOD AND APPARATUS

This application is the U.S. national phase of International Application No. PCT/CN2020/126195 filed Nov. 3, 2020 which designated the U.S. and claims priority to CN 202010659646.6 filed Jul. 8, 2020, the entire contents of each of which are hereby incorporated by reference.

TECHNICAL FIELD

The present disclosure belongs to the field of deep learning, and in particular relates to a method and an apparatus for accelerating dilated convolution computation.

BACKGROUND

This section is intended to provide background or context to embodiments of the present disclosure as set forth in claims. What is described herein is not admitted to be prior art by virtue of its inclusion in this section.

As a type of deep feed-forward artificial neural network, convolutional neural networks (CNNs) have been applied in many fields, such as image recognition. During image data processing, a convolutional neural network may perform relatively complex computations, which mainly include convolutional computation, batch normalization computation, activation computation and the like.

Generally, for image processing using a CNN, multiple convolution and pooling operations are required to increase the model's receptive field. The image size may be reduced through pooling, and then the receptive field may be increased by further using a convolution kernel. A feature map after the convolution and pooling operations may have a relatively small size and thus may be passed to a fully connected network for classification. However, prediction needs to be performed for each pixel during image segmentation. Thus, the feature map having the reduced size needs to be converted back to the original image size by up-sampling approach (e.g., deconvolution) before the prediction. This process mainly has following problems: (1) information loss occurs. Since the pooling operation is irreversible, loss of information is inevitable even when the image size is restored by the up-sampling performed on the feature map. (2) small object images cannot be reconstructed. Information of an object occupying 4×4 pixels is not reconstructable after 4 times of pooling operations. Therefore, in order to avoid using operations such as pooling to expand the receptive field, dilated convolution is proposed in "MULTI-SCALE CONTEXT AGGREGATION BY DILATED CONVOLUTIONS", where the convolution kernel is expanded to a specified size during the dilated convolution operation, and the region not occupied by the original convolution kernel is padded with zeros.

According to the related art, a conventional method for accelerating convolution computation performed on image data to obtain an image processing result is to optimize the convolution operation with the Im2col function. In the process of CNN learning and training, an image is generally not processed in its entirety at once, but the image is first divided into several small blocks (patches), and then each patch needs to be rearranged by Im2col processing to expand the three-dimensional patches into one-dimensional vectors, such that the convolution operation may be converted into a two-dimensional matrix multiplication.

Figure 1:
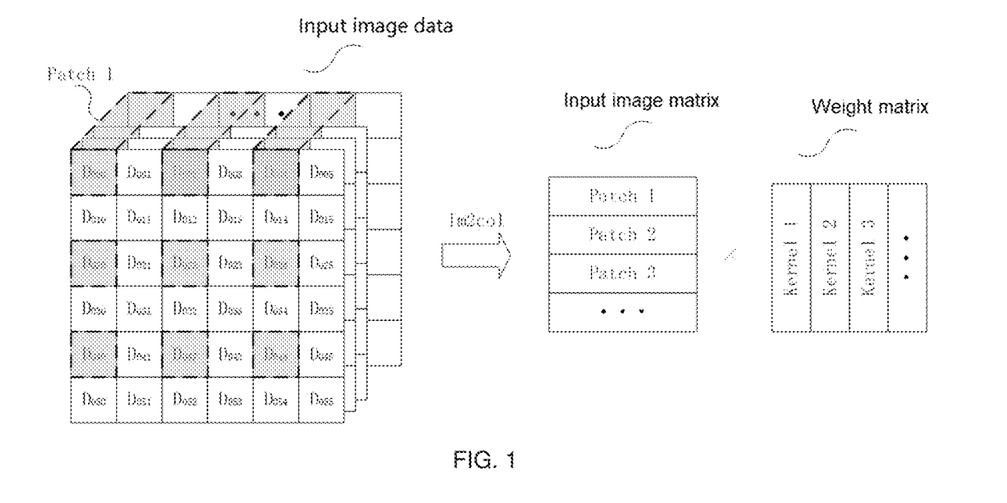
FIG. 1 is a schematic diagram for Im2col-based dilated convolution operation in the related art.

In the aforesaid solution, for a single dilated convolution computation, plural rows and columns of data needs to be accessed at the same time. As shown in FIG. 1 which takes a 3×3 dilated convolution with a dilation rate of 2 as an example, nine numbers required for a single dilated convolution are distributed in three rows and three columns. It should be understood that a bandwidth of data reading can only be ensured for continuous data, and a special design for arrangement of internal memory is required to access said nine numbers at the same time. For example, the internal memory may be divided for improving the parallelism in memory access. However, an NPU (neural processing unit) is generally required to support different sizes of convolutions. Thus, to achieve generality for different convolution kernels, the memory needs to be divided into many small blocks to be compatible with various settings, which however would increase the area of internal memory on the one hand and increase the complexity of data access logic on the other hand.

Therefore, it is a pressing technical problem to be solved at present to design a method for accelerating dilated convolution computation with high generality and low complexity.

SUMMARY

In view of the problems in the related art that implementation of the dilated convolution operation has a poor generality and high complexity, embodiments of the present disclosure propose a method and an apparatus for accelerating dilated convolution computation. According to this method and apparatus, the aforesaid problems can be solved.

Embodiments of the present disclosure provide following solutions.

In a first aspect, provided is a method of accelerating dilated convolution computation. The method includes: decomposing a R×S dilated convolution operation into a number S of R×1 sub-dilated convolution operations, where R refers to the height of a convolution kernel of the R×S dilated convolution operation, and S refers to the width of the convolution kernel; caching, for each of the R×1 sub-dilated convolution operations, a plurality of weight values in parallel into a plurality of computation units of a computation unit array; determining, from input image data, a plurality of input data streams respectively corresponding to the plurality of weight values and inputting the plurality of input data streams in parallel into the plurality of computation units; performing, by the plurality of computation units, sliding window operations and multiplication operations based on respective cached weight values and respective inputted input data streams, and performing accumulation operations among the plurality of computation units to output an intermediate result of said each R×1 sub-dilated convolution operation; and adding up the respective intermediate results of the R×1 sub-dilated convolution operations to acquire a convolution result of the R×S dilated convolution operation.

In a possible embodiment, each of the plurality of input data streams respectively corresponding to the plurality of weight values is determined by reading required data from the input image data according to a dilation rate and a stride of the dilated convolution operation and concatenating the read data.

In a possible embodiment, each of the plurality of input data streams respectively corresponding to the plurality of weight values is determined by reading a plurality of rows of data from the input image data according to a dilation rate and a stride of the dilated convolution operation and concatenating the read rows of data.

In a possible embodiment, a sliding step size of the sliding window operations is determined according to a stride of the dilated convolution operation.

In a possible embodiment, adding up the respective intermediate results of the R×1 sub-dilated convolution operations includes: accumulating the respective intermediate results of the R×1 sub-dilated convolution operations in real time during the R×1 sub-dilated convolution operations, or adding up the respective intermediate results after completion of the R×1 sub-dilated convolution operations.

In a second aspect, provided is an apparatus for accelerating dilated convolution computation. The apparatus includes: a logic control unit and a computation unit array. The logic control unit is configured to: decompose a R×S dilated convolution operation into a number S of R×1 sub-dilated convolution operations, where R refers to the height of a convolution kernel of the R×S dilated convolution operation, and S refers to the width of the convolution kernel; cache, for each of the R×1 sub-dilated convolution operations, a plurality of weight values in parallel into a plurality of computation units of a computation unit array; and determine, from input image data, a plurality of input data streams respectively corresponding to the plurality of weight values, and input the plurality of input data streams in parallel into the plurality of computation units. The computation unit array is configured to: perform, by the plurality of computation units, sliding window operations and multiplication operations based on respective cached weight values and respective inputted input data streams, and perform accumulation operations among the plurality of computation units to output an intermediate result of said each R×1 sub-dilated convolution operation; and add up the respective intermediate results of the R×1 sub-dilated convolution operations to acquire a convolution result of the R×S dilated convolution operation.

In a possible embodiment, the logic control unit is configured to determine each of the plurality of input data streams respectively corresponding to the plurality of weight values by reading required data from the input image data according to a dilation rate and a stride of the dilated convolution operation and concatenating the read data.

In a possible embodiment, the logic control unit is further configured to determine each of the plurality of input data streams respectively corresponding to the plurality of weight values by reading a plurality of rows of data from the input image data according to a dilation rate and a stride of the dilated convolution operation and concatenating the read rows of data.

In a possible embodiment, a sliding step of the sliding window operations is determined according to the stride of the dilated convolution operation.

In a possible embodiment, the computation unit array is configured to accumulate the respective intermediate results of the R×1 sub-dilated convolution operations in real time during the R×1 sub-dilated convolution operations, or add up the respective intermediate results after completion of the R×1 sub-dilated convolution operations.

At least one of the technical solutions employed in embodiments of the present disclosure can achieve the following beneficial effects. By decomposing a R×S dilated convolution operation is decomposed into a number S of R×1 sub-dilated convolution operations, caching a plurality of weight values acquired from the decomposition in parallel into a column of computation units, performing, by the computation units, sliding window operations and multiplication operations on the input data streams based on respective cached weight values, and performing accumulation operations among the computation units, the dilated convolution operation can be accelerated. According to this solution, there is no need to implement Im2col function separately, which reduces the complexity.

It should be noted that the aforesaid description only shows a summary of the technical solutions of the present disclosure to facilitate better understanding of technical means of the present disclosure for implementing the present disclosure in accordance with the content described in the specification. Specific embodiments of the present disclosure will be given below to make the above and other objects, features, and advantages of the present disclosure more apparent.

BRIEF DESCRIPTION OF THE DRAWINGS

By reading following details of the exemplary embodiments below, those of ordinary skills in the art may understand the advantages and benefits described herein and other advantages and benefits. The accompanying drawings are for the purpose of illustrating exemplary embodiments only and are not intended to be a limitation of the present disclosure. Further, a same reference sign is adopted to indicate a same component throughout the accompanying drawings. In the accompanying drawings:

FIG. 4b is another schematic diagram for the dilated convolution operation illustrated in FIG. 4a;

In the accompanying drawings, the same or corresponding reference signs indicate same or corresponding portions.

DETAILED DESCRIPTION

Exemplary embodiments of the present disclosure will be described below in more detail with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In the present disclosure, it should be understood that terms such as "include" or "have" are intended to indicate the existence of the characteristics, figures, steps, actions, components, parts disclosed by the specification or any combination thereof, without excluding the existence of one or more other characteristics, figures, steps, actions, components, parts or any combination thereof.

Furthermore, it should be noted that, in the case of no conflict, the embodiments of the present disclosure and features of the embodiments may be combined with each other in any manner. The present disclosure will be described in detail below with reference to the accompanying drawings and embodiments.

Figure 2:
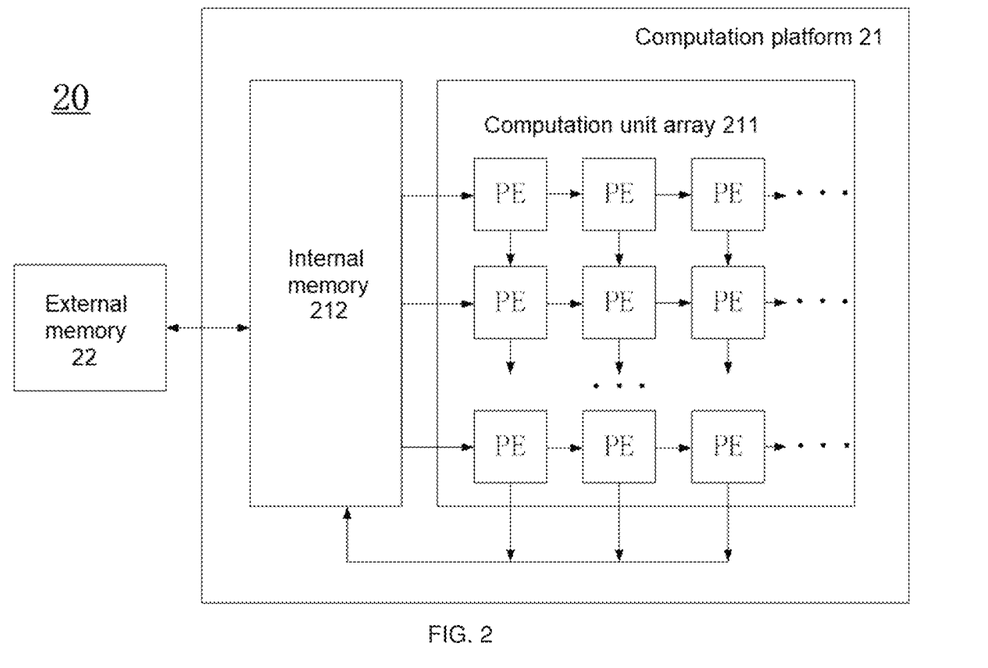
FIG. 2 is a schematic structural diagram of a convolutional neural network computing apparatus.

FIG. 2 is a schematic structural diagram of an apparatus 20 for accelerating dilated convolution computation. The apparatus includes a computation platform 21 and an external memory 22. The computation platform 21 may at least include a computation unit array 211 for performing dilated convolution operations, and an internal memory 212. Generally, the external memory 22 may be a low-cost storage medium, which is generally limited in bandwidth and has relatively high read/write power consumption. The internal memory may generally be a storage media having a relatively fast access speed, such as SRAM. SRAM has a relatively large bandwidth and a low read/write cost, but is usually costly and therefore generally has a limited capacity.

Figure 3:
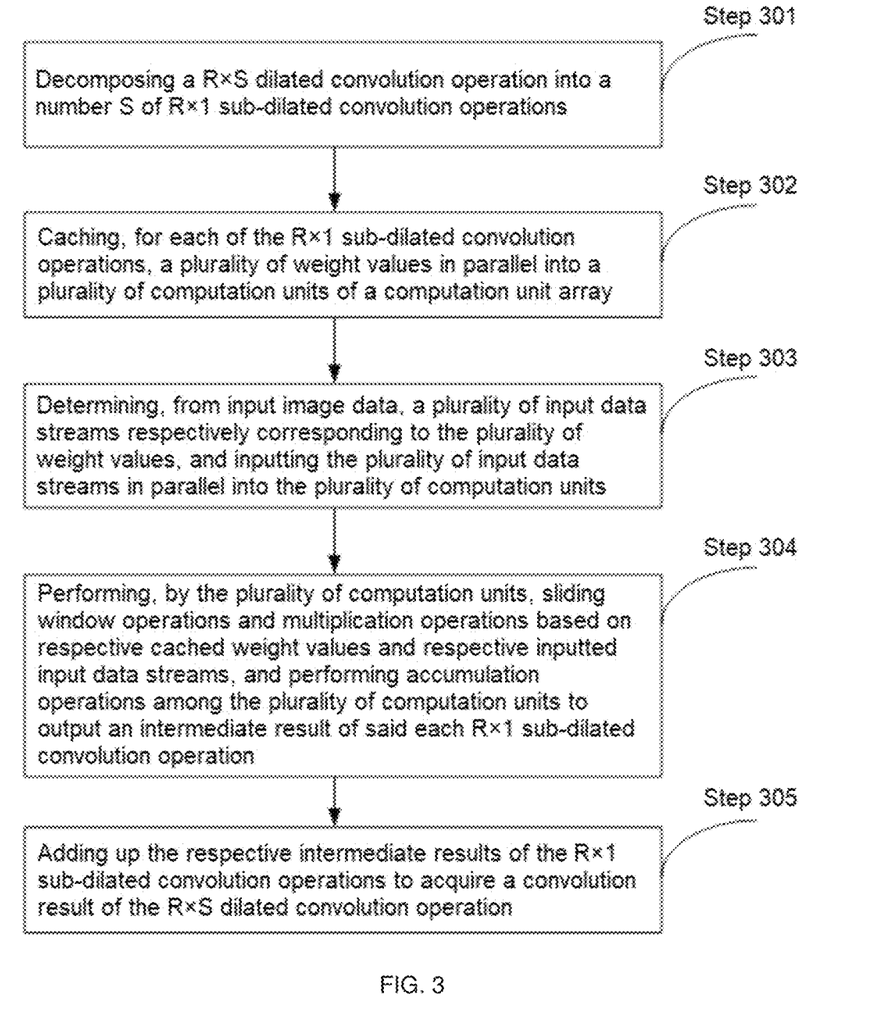
FIG. 3 is a schematic flowchart of a method of accelerating dilated convolution computation according to an embodiment of the present disclosure.

FIG. 3 is a schematic flowchart of a method 300 of accelerating dilated convolution computation according to an embodiment of the present disclosure. Various aspects of the method 300 of accelerating dilated convolution computation shown in FIG. 3 will be described in detail below in conjunction with the apparatus for accelerating dilated convolution computation shown in FIG. 2.

As shown in FIG. 3, the method 300 may include:

step 301 of decomposing a R×S dilated convolution operation into a number S of R×1 sub-dilated convolution operations, where R refers to the height of a convolution kernel of the R×S dilated convolution operation, and S refers to the width of the convolution kernel;

step 302 of caching, for each of the R×1 sub-dilated convolution operations, a plurality of weight values in parallel into a plurality of computation units of a computation unit array;

step 303 of determining, from input image data, a plurality of input data streams respectively corresponding to the plurality of weight values, and inputting the plurality of input data streams in parallel into the plurality of computation units;

step 304 of performing, by the plurality of computation units, sliding window operations and multiplication operations based on respective cached weight values and respective inputted input data streams, and performing accumulation operations among the plurality of computation units to output an intermediate result of said each R×1 sub-dilated convolution operation; and step 305 of adding up the respective intermediate results of the R×1 sub-dilated convolution operations to acquire a convolution result of the R×S dilated convolution operation.

Figure 4A:
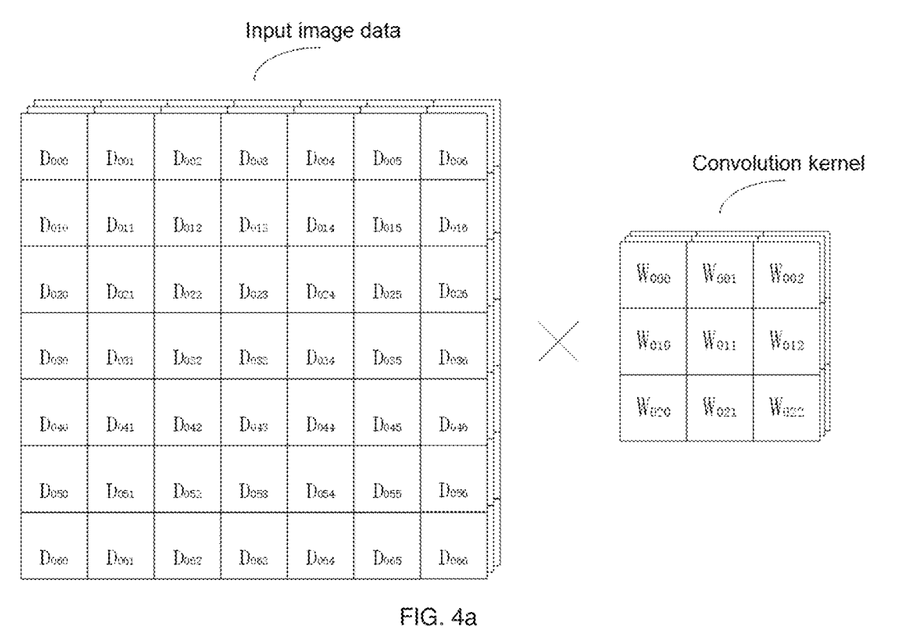
FIG. 4a is a schematic diagram for a dilated convolution operation.
Figure 4B:
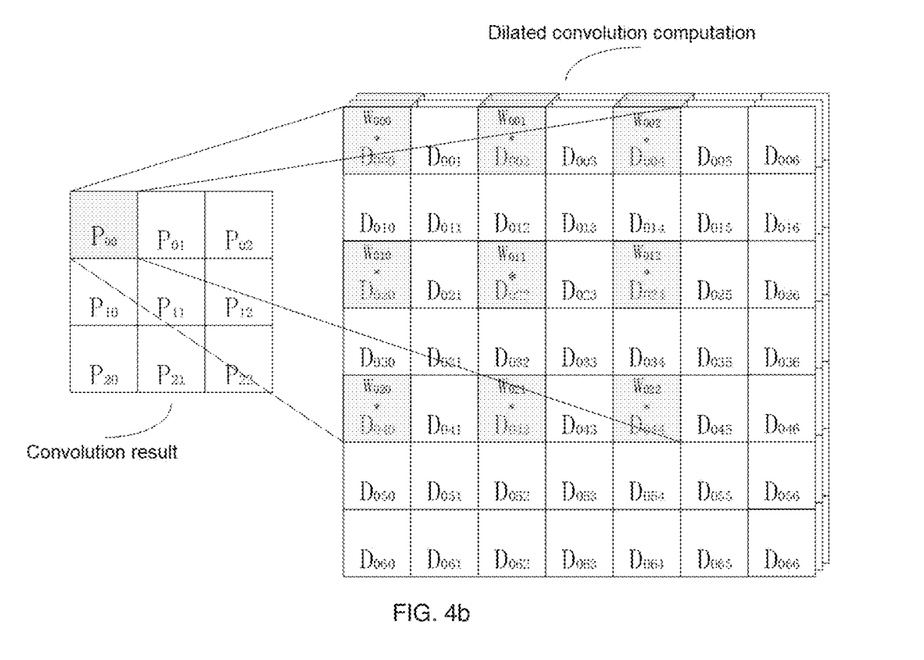

FIG. 4a and FIG. 4b illustrate an example of the dilated convolution operation. As shown in FIG. 4a, the input image data for the dilated convolution operation is a matrix data consisting of several pixel values $D_{abc}$, where the subscript a refers to the channel index, the subscript b refers to the row index with its value range of 0, 1, . . . , 6, and the subscript c refers to the column index with its value range of 0, 1, . . . , 6. That is, the matrix data has a size of 7(columns)× 7(rows). This input image data may be acquired based on a real image inputted to a neural network model, and may generally be stored sequentially on the external memory 22 in a row-by-row and channel-by-channel manner. The convolution kernel of this dilated convolution layer is composed of several weight values $W_{edf}$, where the subscript e refers to the channel index, the subscript d refers to the row index with a value range of 0, 1, 2, and the subscript f refers to the column index with a value range of 0, 1, 2. That is, the convolution kernel has a size of 3(columns)×3(rows), and the convolution kernel may be acquired by training several image sample data and may generally be stored on the external memory 22. As shown in FIG. 4b, as a result of the dilated convolution, an output data is acquired by performing the dilated convolution on the input image data with the convolution kernel, where for each $P_{xy}$, the subscript x refers to the row index with a value range of 0, 1, 2, and the subscript y refers to the column index with a value range of 0, 1, 2. That is, the output data has a size of 3(columns)×3 (rows). In embodiments of the present disclosure, the dilated convolution operation as implemented is namely an operation of reflecting the dilated convolution result from the input image data and the weight matrix. Embodiments of the present disclosure are described by taking the computation for channel 0 as an example. It is understood by those skilled in the art that computations for other channels may be implemented according to the computation logic for channel 0.

Embodiments of the present disclosure will be described by taking the dilated convolution operation shown in FIG. 4a and FIG. 4b as an example.

Figure 5:
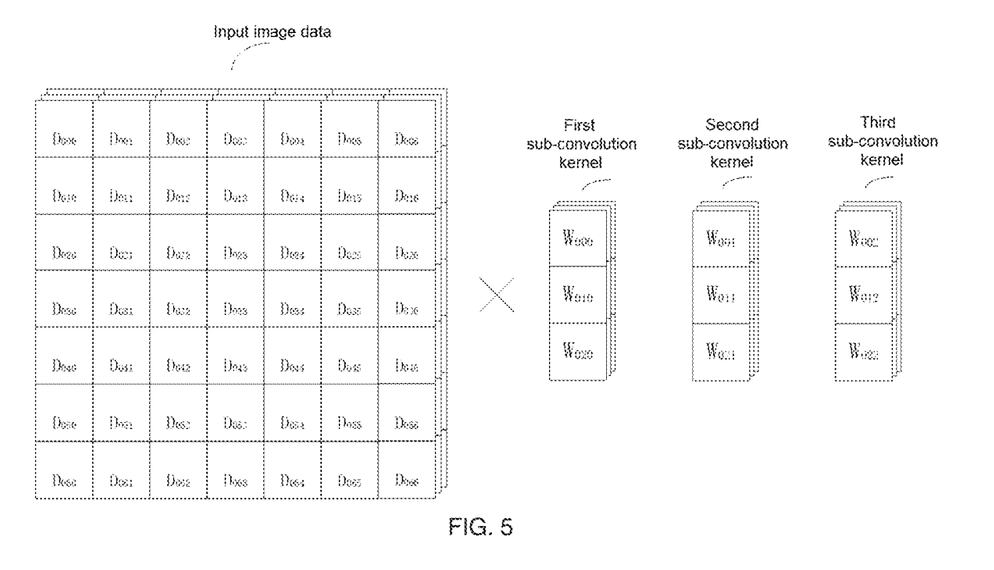
FIG. 5 is a schematic diagram for an operation of decomposing a R×S dilated convolution operation into a number S of R×1 sub-dilated convolution operations according to an embodiment of the present disclosure.

It is assumed that the dilated convolution operation has the dilation rate $\lambda$ of 2, and the stride s of 1. Firstly, the 3×3 dilated convolution operation shown in FIG. 4a and FIG. 4b may be decomposed into three 3×1 sub-dilated convolution operations. For example, as shown in FIG. 5, the 3×3 convolution kernel is split into three 3×1 sub-convolution kernels that are the first sub-convolution kernel, the second sub-convolution kernel, and the third sub-convolution kernel. Then, the dilated convolution operation shown in FIG. 4b is split into the three sets of sub-dilated convolution operations shown in FIG. 6.

Figure 7:
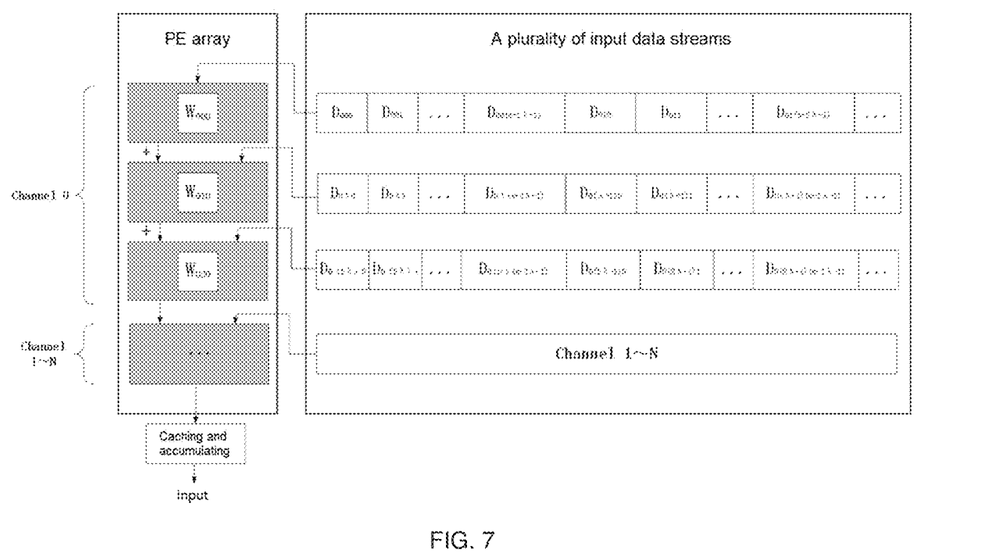
FIG. 7 is a schematic diagram for dilated convolution implemented by computation units (PEs) with respective weight values cached therein according to an embodiment of the present disclosure.

Next, for each 3×1 sub-dilated convolution operation, taking the convolution computation of channel 0 as an example for description as shown in FIG. 7, three weight values ($W_{000}$, $W_{010}$, $W_{020}$) are cached in parallel into three computation units in the computation unit array. Then, three input data streams respectively corresponding to the three weight values ($W_{000}$, $W_{010}$, $W_{020}$) are determined from the input image data, and the three input data streams are input in parallel into the three computation units.

In some possible embodiments, multiple rows of data are determined from the input image data according to the dilation rate $\lambda=2$ and the stride $s=1$ of the dilated convolution operation, and then, required data is read from the multiple rows of data and concatenated to determine the input data stream corresponding to each weight value. For example, the data stream to be inputted to the computation unit with the weight value $W_{000}$ cached therein may be ($D_{000}$, $D_{001}$, $D_{002}$, $D_{010}$, $D_{011}$, $D_{012}$, $D_{020}$, $D_{021}$, $D_{022}$), i.e., ($D_{000}$, . . . , $D_{00(W-2\lambda-1)}$, $D_{010}$, . . . , $D_{01(W-2\lambda-1)}$, $D_{0(H-2\lambda-1)0}$, . . . , $D_{0(H-2\lambda-1)(W-2\lambda-1)}$), where W refers to the width of the input image data which is 7, and H refers to the height of the input image data which is 7. Accordingly, the data streams to be respectively inputted to the computation units with respective weight values $W_{010}$ and $W_{020}$ cached therein may be derived in turn. Then, sliding window operations and multiplication operations are performed within the three computation units based on respective cached weight values and respective inputted input data streams, and accumulation operations are performed among the three computation units to output the intermediate result of said each 3×1 sub-dilated convolution operation. For example, within each computation unit, sliding window operations are performed on the input data stream by taking the weight value cached therein as the sliding window, where for each sliding window operation, a multiplication operation is performed on the data in the window to acquire a multiplication result, and after the multiplication operation of each computation unit, an accumulation operation is performed on the multiplication results of the three computation units to acquire an intermediate result corresponding to a pixel position.

In a possible embodiment, adding up the respective intermediate results of the R×1 sub-dilated convolution operations includes: accumulating the respective intermediate results of the R×1 sub-dilated convolution operations in real time during the R×1 sub-dilated convolution operations, or adding up the respective intermediate results after completion of the R×1 sub-dilated convolution operations. For example, after calculating the first to third intermediate results with the computation unit array, the cached intermediate results of the three 3×1 sub-dilated convolution operations are added up to acquire the convolution result of the 3×3 dilated convolution operation. Optionally, accumulation may be performed in real time during the respective computations performed by the computation units. For example, $P_{00''}$ in the second intermediate result may be added to $P_{00'}$ in the first intermediate result in real time after being calculated. Optionally, the adding-up mode may be determined based on the size of the on-chip cache area, that is, accumulation is performed in real time during the respective computations, or addition is performed on respective intermediate results after all the computations are completed.

In some other possible embodiments, in order to further simplify the data reading logic, the multiple rows of data from the input image data may be read according to the dilation rate and the stride of the dilated convolution operation, and then concatenated to determine the input data stream corresponding to each weight value. For example, in a case that the dilation rate λ is 2, the stride s is 1, the convolution kernel has a size of 3×3, and the input image data has a size of 7×7, the first, second, and third rows of data of the input image data after being concatenated may be directly input to the computation unit with the weight value $W_{000}$ cached therein, i.e., ($D_{000}, \ldots, D_{006}, D_{010}, \ldots, D_{016}, D_{020}, \ldots, D_{026}$). The sliding region for the sliding window operations may be controlled internally by the computation unit. For example, the sliding window operations may be performed only on those data with column indices not exceeding 2 within the data stream and skip those data with column indices greater than 2.

Figure 8:
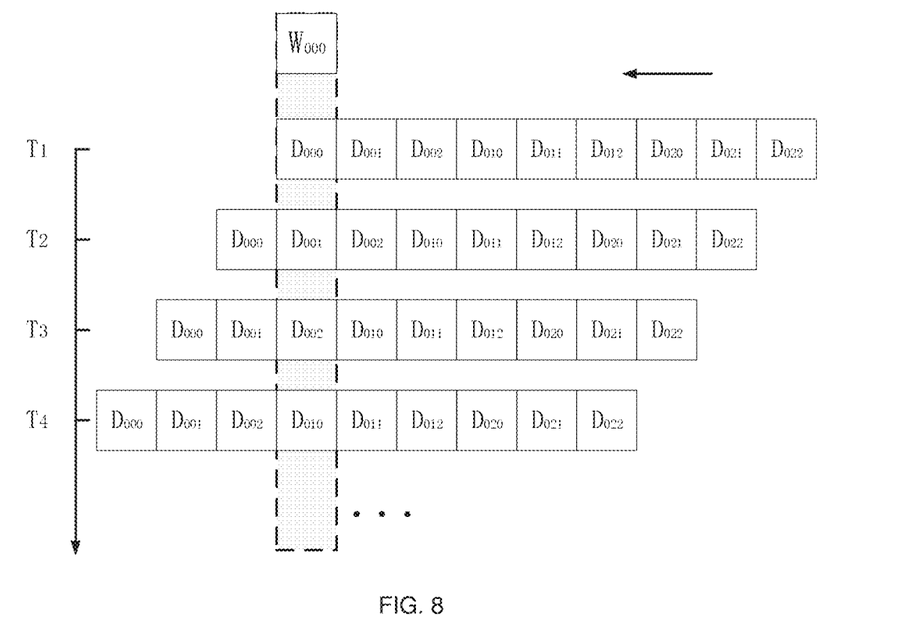
FIG. 8 is a schematic diagram for sliding window operations performed by a computation unit (PE) with a weight value cached therein according to an embodiment of the present disclosure.

As shown in FIG. 8, by taking the aforesaid 3×3 dilated convolution operation as an example, the operation of the computation unit array is described based on the computation unit with the weight value $W_{000}$ cached therein. In the timing $T_1$, the weight value $W_{000}$ slides to $D_{000}$ on the input data stream, and a multiplication operation $W_{000}*D_{000}$ is performed based on the weight value and the input data in the window. Meanwhile, other computation units (PEs) also perform synchronous sliding on their respective input data streams based on respective cached weight values, and respective multiplication operations are performed based on respective weight values and respective data in respective windows. For example, the weight value $W_{001}$ slides to $D_{020}$, the weight value $W_{002}$ slides to $D_{040}$, and so forth, such that the multiplication result of each computation unit at the timing $T_1$ can be acquired. Then, all the multiplication results of the column of computation units corresponding to the first sub-convolution kernel at the timing $T_1$ may be summed to acquire an output value $P_{00'}$. In the timing $T_2$, the weight value $W_{000}$ slides to $D_{001}$ on the input data stream according to the stride, and so forth, such that another output value $P_{01'}$ in FIG. 6 can be acquired and yet another output value $P_{02'}$ in FIG. 6 can be acquired in the timing $T_3$. Finally, each value of the first intermediate result in FIG. 6 may be acquired, and the first intermediate result is cached.

Figure 6:
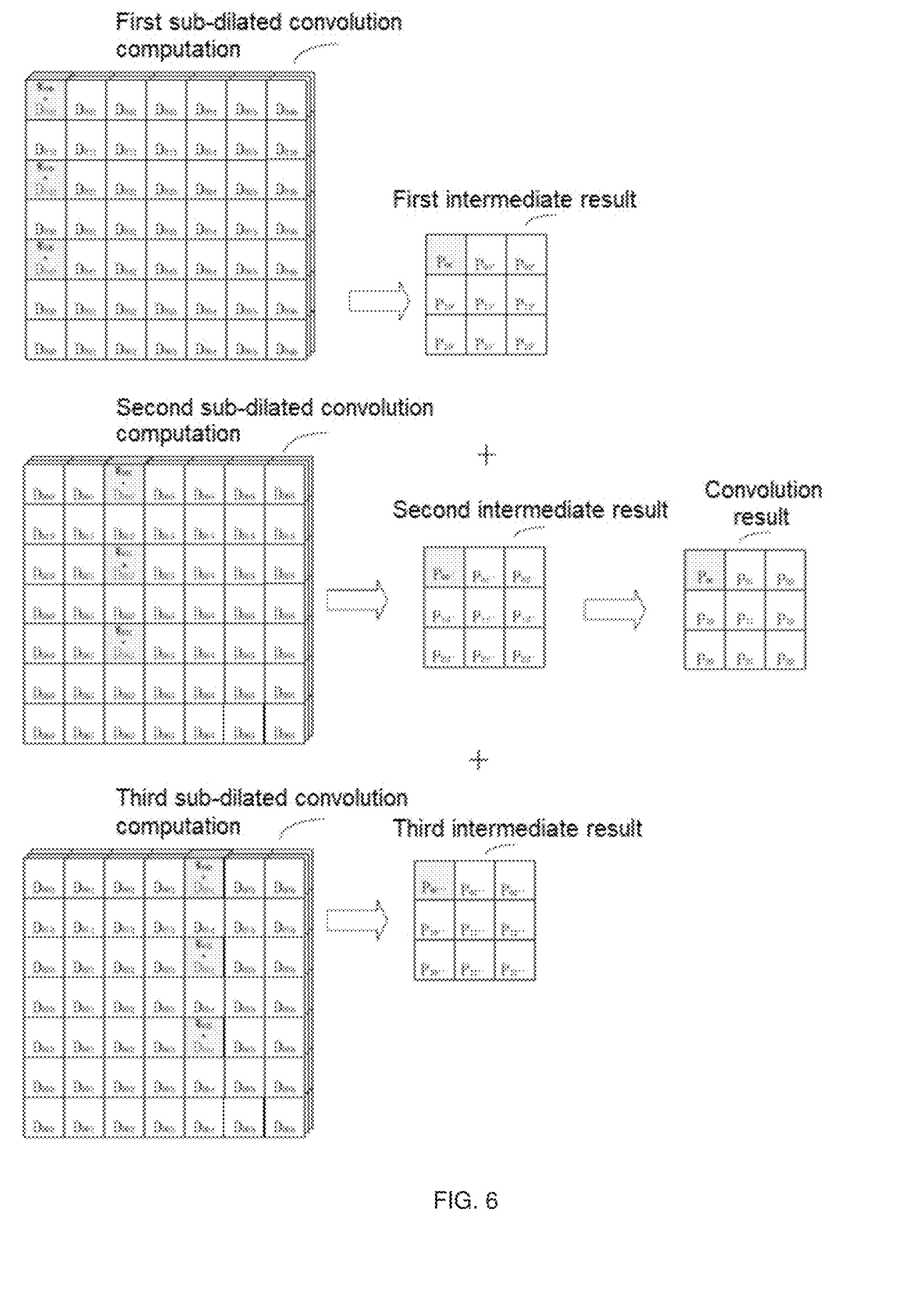
FIG. 6 is another schematic diagram for an operation of decomposing a R×S dilated convolution operation into a number S of R×1 sub-dilated convolution operations according to an embodiment of the present disclosure.

It should be understood that after the computation involving the first sub-convolution kernel is executed, the cached values in the computation unit array may be updated as the plurality of weight values of the second sub-convolution kernel, and each value of the second intermediate result in FIG. 6 is acquired in a similar manner as described above. By analogy, all the intermediate results respectively corresponding to the sub-dilated convolution operations can be acquired, and the convolution result of the dilated convolution operation may be acquired by adding up the corresponding positions of the plurality of intermediate results.

In another embodiment, multiple columns of computation units may be utilized to simultaneously implement the dilated convolution operations of a plurality of convolution kernels. Furthermore, the weight values at the same position in different convolution kernels may correspond to the same input data stream, such that the weight values at the same position in different convolution kernels may be arranged in the same row of the computation unit array.

In some possible embodiments, a sliding step of the sliding window operations in step 304 is determined according to the stride of the dilated convolution operation. For example, in the sliding window operations shown in FIG. 8, the sliding step is the same as the stride.

In this embodiment, according to the aforesaid method, there is no need to perform frequent inter-row or inter-column reading of input image data that is stored continuously in the external memory in a single memory direction, and no special design is required for the arrangement of the internal memory, such that a method of accelerating dilated convolution computation with a high generality and a low complexity can be achieved. In addition, there is no need to additionally implement Im2col function in the computation platform, which saves the hardware resource and computing power consumption.

Figure 9:
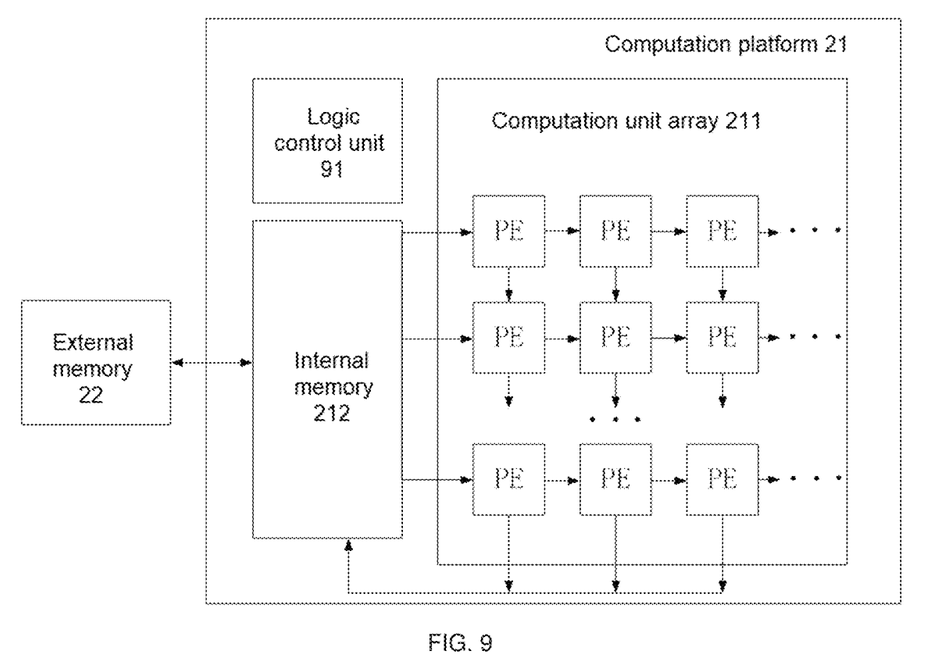
FIG. 9 is a schematic structural diagram of an apparatus for accelerating dilated convolution computation according to an embodiment of the present disclosure.

Based on the same or similar technical concepts, embodiments of the present disclosure further provide an apparatus for accelerating dilated convolution computation. The apparatus includes a logic control unit 91 and a computation unit array 211.

The logic control unit is configured to: decompose a R×S dilated convolution operation into a number S of R×1 sub-dilated convolution operations, R referring to the height of a convolution kernel of the R×S dilated convolution operation and S referring to the width of the convolution kernel; cache, for each of the R×1 sub-dilated convolution operations, a plurality of weight values in parallel into a plurality of computation units of a computation unit array; and determine a plurality of input data streams respectively corresponding to the plurality of weight values and input the plurality of input data streams in parallel into the plurality of computation units.

The computation unit array is configured to: perform, by the plurality of computation units, sliding window operations and multiplication operations based on respective cached weight values and respective inputted input data streams, and perform accumulation operations among the plurality of computation units to output an intermediate result of said each R×1 sub-dilated convolution operation; and add up the respective intermediate results of the R×1 sub-dilated convolution operations to acquire a convolution result of the R×S dilated convolution operation.

In some possible embodiments, the logic control unit 91 is configured to determine each of the plurality of input data streams respectively corresponding to the plurality of weight values by reading required data from the input image data according to a dilation rate and a stride of the R×S dilated convolution operation and concatenating the read data.

In some other possible embodiments, the logic control unit 91 is further configured to determine each of the plurality of input data streams respectively corresponding to the plurality of weight values by reading a plurality of rows of data from the input image data according to a dilation rate and a stride of the R×S dilated convolution operation and concatenating the read rows of data.

In some possible embodiments, a sliding step of the sliding window operations is determined according to a stride of the R×S dilated convolution operation.

In a possible embodiment, the computation unit array is configured to accumulate the respective intermediate results of the R×1 sub-dilated convolution operations in real time during the R×1 sub-dilated convolution operations, or adding up the respective intermediate results after completion of the R×1 sub-dilated convolution operations.

The respective embodiments of the present disclosure are described in a progressive manner. The reference may be made to each other for the same or similar parts of the respective embodiments, and each embodiment focuses on the differences from other embodiments. Especially, for the embodiments of apparatus, since they basically correspond to the embodiments of the method, they are described in a simple way, and reference may be made to the description part on embodiments of the method for relevant points.

The apparatus according to embodiments of the present disclosure correspond to the method one by one. Thus, the apparatus has similar beneficial technical effects with the corresponding method. Since the beneficial technical effects of the method have been described in detail above, the beneficial technical effects of the apparatus will not be repeated here.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

What is claimed is:

1. A method of accelerating dilated convolution computation, comprising:
   decomposing a R×S dilated convolution operation into a number S of R×1 sub-dilated convolution operations, wherein the R refers to the height of a convolution kernel of the R×S dilated convolution operation, and the S refers to the width of the convolution kernel;
   caching, for each of the R×1 sub-dilated convolution operations, a plurality of weight values in parallel into a plurality of computation units of a computation unit array;
   determining, from input image data, a plurality of input data streams respectively corresponding to the plurality of weight values, and inputting the plurality of input data streams in parallel into the plurality of computation units;
   performing, by the plurality of computation units, sliding window operations and multiplication operations based on respective cached weight values and respective inputted input data streams, and performing accumulation operations among the plurality of computation units to output an intermediate result of said each R×1 sub-dilated convolution operation; and
   adding up the respective intermediate results of the R×1 sub-dilated convolution operations to acquire a convolution result of the R×S dilated convolution operation.

2. The method according to claim 1, wherein each of the plurality of input data streams respectively corresponding to the plurality of weight values is determined by reading required data from the input image data according to a dilation rate and a stride of the R×S dilated convolution operation and concatenating the read data.

3. The method according to claim 1, wherein each of the plurality of input data streams respectively corresponding to the plurality of weight values is determined by reading a plurality of rows of data from the input image data according to a dilation rate and a stride of the R×S dilated convolution operation and concatenating the read rows of data.

4. The method according to claim 1, wherein a sliding step of the sliding window operations is determined according to a stride of the R×S dilated convolution operation.

5. The method according to claim 1, wherein adding up the respective intermediate results of the R×1 sub-dilated convolution operations comprises: accumulating the respective intermediate results of the R×1 sub-dilated convolution operations in real time during the R×1 sub-dilated convolution operations, or adding up the respective intermediate results after completion of the R×1 sub-dilated convolution operations.

6. An apparatus for accelerating dilated convolution computation, comprising a logic control unit and a computation unit array, wherein
   the logic control unit is configured to: decompose a R×S dilated convolution operation into a number S of R×1 sub-dilated convolution operations, wherein R refers to the height of a convolution kernel of the R×S dilated convolution operation, and S refers to the width of the convolution kernel; cache, for each of the R×1 sub-dilated convolution operations, a plurality of weight values in parallel into a plurality of computation units of a computation unit array; and determine, from input image data, a plurality of input data streams respectively corresponding to the plurality of weight values and inputting the plurality of input data streams in parallel into the plurality of computation units; and the computation unit array is configured to: perform, by the plurality of computation units, sliding window operations and multiplication operations based on respective cached weight values and respective inputted input data streams, and perform accumulation operations among the plurality of computation units to output an intermediate result of said each R×1 sub-dilated convolution operation; and add up the respective intermediate results of the R×1 sub-dilated convolution operations to acquire a convolution result of the R×S dilated convolution operation.

7. The apparatus according to claim 6, wherein the logic control unit is configured to determine each of the plurality of input data streams respectively corresponding to the plurality of weight values by reading required data from the input image data according to a dilation rate and a stride of the R×S dilated convolution operation and concatenating the read data.

8. The apparatus according to claim 6, wherein the logic control unit is configured to determine each of the plurality of input data streams respectively corresponding to the plurality of weight values by reading a plurality of rows of data from the input image data according to a dilation rate and a stride of the R×S dilated convolution operation and concatenating the read rows of data.

9. The apparatus according to claim 6, wherein a sliding step of the sliding window operations is determined according to a stride of the R×S dilated convolution operation.

10. The apparatus according to claim 6, wherein the computation unit array is configured to accumulate the respective intermediate results of the R×1 sub-dilated convolution operations in real time during the R×1 sub-dilated convolution operations, or add up the respective intermediate results after completion of the R×1 sub-dilated convolution operations.

* * * * *